Jan. 8, 1935.  R. E. HUSTED  1,987,255
PLANT PROTECTOR
Filed Aug. 14, 1934　　2 Sheets-Sheet 1
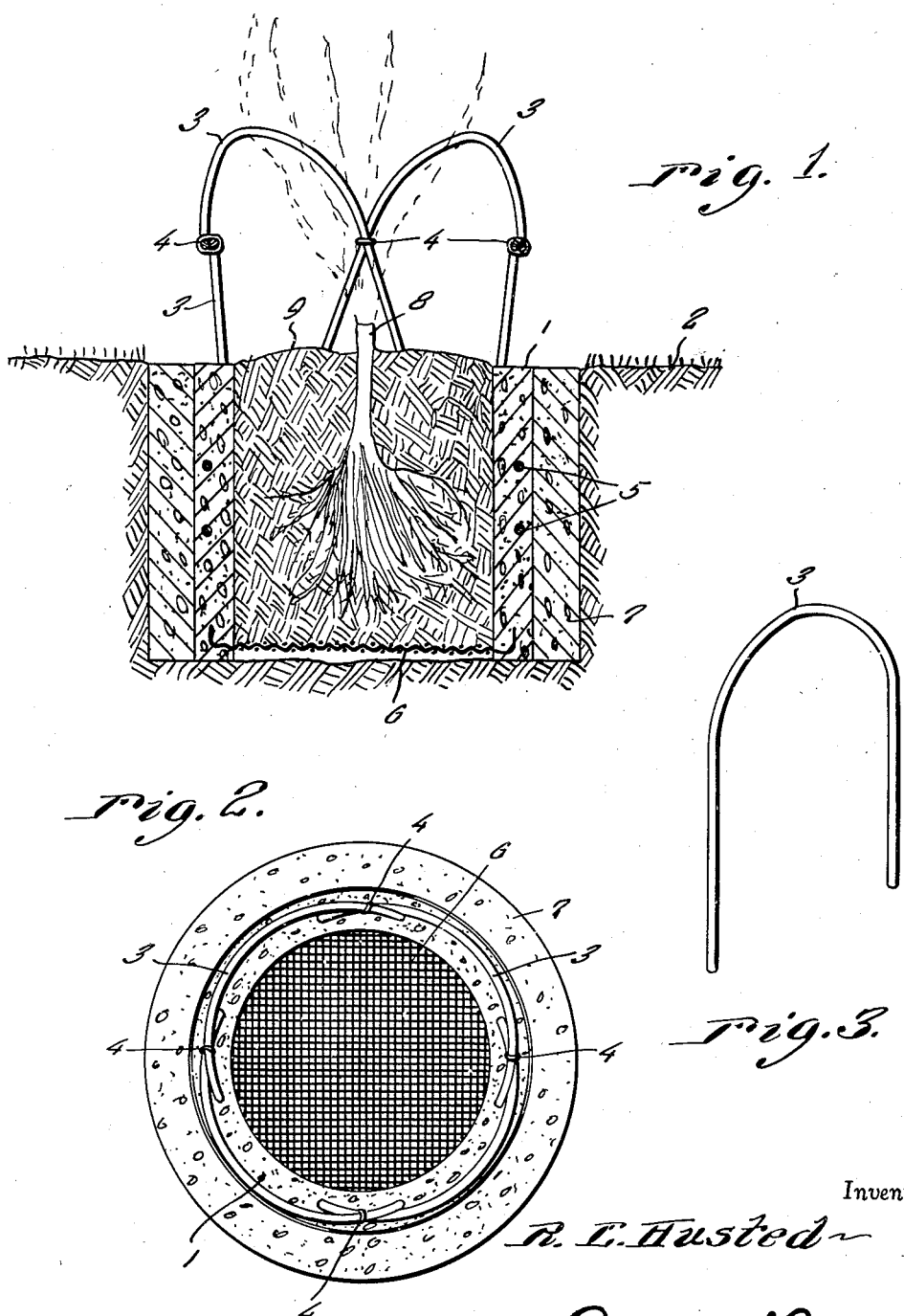
Inventor
R. E. Husted
By Clarence A. O'Brien
Attorney Jan. 8, 1935.　　　　R. E. HUSTED　　　　1,987,255
PLANT PROTECTOR
Filed Aug. 14, 1934　　　2 Sheets-Sheet 2

Inventor
R. E. Husted
By Clarence A. O'Brien
Attorney

UNITED STATES PATENT OFFICE 1,987,255

PLANT PROTECTOR

Raymond E. Husted, Tuxedo Park, N. Y.

Application August 14, 1934, Serial No. 739,787

6 Claims. (Cl. 47—26)

The present invention relates to new and useful improvements in plant protectors and has for some of its objects to provide, in a manner as hereinafter set forth, a device of this character which will be comparatively simple in its construction, strong, durable, efficient and reliable in use, inconspicuous and which may be manufactured at low cost.

Another important object of the invention is to provide a protector of the aforementioned character embodying a construction which is such that said protector, with the plant therein, may be conveniently moved from place to place if desired.

Still another important object of the invention is to provide a protector of the character described which includes means for preventing grass and other vegetation from growing within a certain distance, thus permitting the use of a mower for cutting said grass and other vegetation and eliminating the necessity for using hand clippers or trimmers.

All of the foregoing and still further objects and advantages of the invention will become apparent from a study of the following specification, taken in connection with the accompanying drawings wherein like characters of reference designate corresponding parts throughout the several views, and wherein:

Fig. 1 is a view in vertical section through a plant protector in accordance with the present invention, showing same embedded in the ground.

Fig. 2 is a top plan view of the invention.

Fig. 3 is a detail view in perspective of one of the guards.

Figure 4:
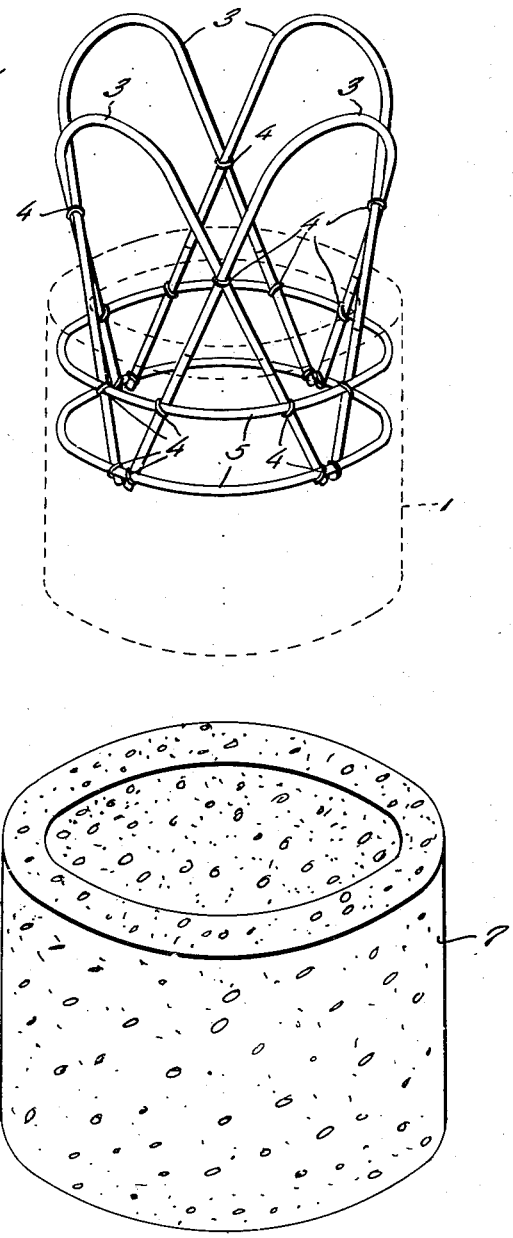
Fig. 4 is a perspective view, showing the inner and outer rings or cylinders separated, the former being indicated in broken lines.

Referring now to the drawings in detail, it will be seen that the embodiment of the invention which has been illustrated comprises a ring 1 of suitable material which, as illustrated to advantage in Fig. 1 of the drawings, is adapted to be embedded in the ground 2 in a manner to be substantially flush with the surface of said ground. The ring 1 is preferably of reinforced concrete but it will be understood, of course, that other suitable material may be used.

Embedded in the ring 1 and rising therefrom are substantially U-shaped, inclined guards 3 of suitable material, preferably metal. The upper portions of the legs of the guards 3 cross, as best seen in Fig. 4 of the drawings, and at these points, said guards are soldered, welded or tied together, as at 4. The lower portions of the guards 3 are secured in a similar manner to wire anchoring and reinforcing rings 5 which are embedded in the ring 1. The reference numeral 6 designates a wire mesh bottom which is provided in the lower portion of the ring 1, the marginal portion of said bottom 6 being embedded in said ring, as illustrated to advantage in Fig. 1 of the drawings.

The reference numeral 7 designates an outer ring of suitable material which is permanently embedded in the ground 2 and which slidably receives the inner ring 1. The outer ring 7 is preferably of greater thickness than the inner ring 1 and said outer ring is also preferably of reinforced concrete.

It is thought that the use of the invention will be readily apparent from the foregoing. As hereinbefore stated, the outer ring 7 is permanently embedded in the ground and the upper end thereof is flush with the surface of said ground. It will thus be seen that the inner ring 1, with the plant 8 and the soil 9, etc., therein may be conveniently placed in said outer ring or removed therefrom when desired. The outer ring 7 prevents grass and other vegetation from growing too close to the guards 3 for permitting the use of a conventional lawn mower around the plant and, as previously stated, eliminating the necessity for using hand clippers or trimmers. By placing small stones, or peat moss on the mesh bottom 6 beneath the soil 9, said soil will be prevented from falling through said mesh bottom when the plant is being moved from place to place in the inner ring 1. The mesh bottom 6 assures complete drainage of the device and permits the roots of the plant to grow through to the natural ground or subsoil if said device is left undisturbed long enough. However, the mesh bottom 6 may be omitted if desired or if found unnecessary, as when moving of the plant is not contemplated. The outer ring 7 may also be omitted if desired. The substantially U-shaped guards 3 constitute means for conveniently carrying or moving the plant in the inner ring 1.

It is believed that the many advantages of a plant protector in accordance with the present invention will be readily understood and although a preferred embodiment of the invention is illustrated and described, it is to be understood that changes in the details of construction and in the combination and arrangement of parts may be resorted to which will fall within the scope of the invention as claimed.

What is claimed is:

1. A plant protector comprising a ring for the reception of the plant, said ring being open at its top and bottom and being adapted to be embedded in the ground, and guards embedded in the ring and rising therefrom.

2. A plant protector comprising a ring for the reception of the plant, said ring being open at its top, a mesh bottom in the lower portion of the ring, and substantially U-shaped guards embedded in the ring and rising from the top thereof.

3. A plant protector comprising a ring open at its top, said ring for the reception of the plant, and substantially U-shaped inclined guards embedded in the ring and rising therefrom, the legs of said guards crossing each other and being secured together.

4. A plant protector of the class described comprising a ring for the reception of the plants, substantially U-shaped guards mounted in the ring and rising therefrom, and anchoring rings embedded in the first named ring and secured to the lower portions of the guards.

5. A plant protector comprising a ring of substantially uniform diameter for the reception of the plant, a mesh bottom in the lower portion of the ring, said ring being open at its top, substantially U-shaped, inclined guards embedded in the ring and rising therefrom, the legs of said guards being crossed with each other and secured together, and anchoring rings embedded in the first named ring and secured to the guards.

6. A plant protector comprising, in combination, an outer ring, a removable inner ring slidably engageable in the outer ring, and guards rising from the inner ring.

RAYMOND E. HUSTED.